US006852410B2

(12) United States Patent
Veedu et al.

(10) Patent No.: US 6,852,410 B2
(45) Date of Patent: Feb. 8, 2005

(54) MACROSCOPIC FIBER COMPRISING SINGLE-WALL CARBON NANOTUBES AND ACRYLONITRILE-BASED POLYMER AND PROCESS FOR MAKING THE SAME

(75) Inventors: Sreekumar T. Veedu, Atlanta, GA (US); Satish Kumar, Lawrenceville, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 10/609,724

(22) Filed: Jun. 30, 2003

(65) Prior Publication Data

US 2004/0180201 A1 Sep. 16, 2004

Related U.S. Application Data

(60) Provisional application No. 60/392,955, filed on Jul. 1, 2002.

(51) Int. Cl.[7] .................................................. D01F 6/00
(52) U.S. Cl. ........................ 428/367; 428/372; 428/394
(58) Field of Search .................................. 428/367, 372, 428/394; 423/447.1, 447.2

(56) References Cited

PUBLICATIONS

Ko et al., "Structure and Properties of Carbon Nanotube Reinforced Nanocomposites," *American Institute of Aeronautics and Astronautics* 2002–1426, pp. 1–9 (Apr. 23, 2002).

Weisenberger et al., "Enhanced Mechanical Properties in Polyacrylonitrile/Multiwall Carbon Nanotube Composite Fibers," *Journal of Nanoscience and Nanotechnology,* vol. 3, No. 6 (Dec. 2003).

Ko et al., "Carbon Nanotube Reinforced Nanocomposites by the Electrospinning Process," *Proceedings of the American Society for Composites 16th Annual Technical Conference* (Sep. 11, 2001).

(List continued on next page.)

*Primary Examiner*—N. Edwards
(74) *Attorney, Agent, or Firm*—Williams, Morgan & Amerson, P.C.

(57) ABSTRACT

The present invention relates to a high modulus macroscopic fiber comprising single-wall carbon nanotubes (SWNT) and an acrylonitrile-containing polymer. In one embodiment, the macroscopic fiber is a drawn fiber having a cross-sectional dimension of at least 1 micron. In another embodiment, the acrylonitrile polymer-SWNT composite fiber is made by dispersing SWNT in a solvent, such as dimethyl formamide or dimethyl acetamide, admixing an acrylonitrile-based polymer to form a generally optically homogeneous polyacrylonitrile polymer-SWNT dope, spinning the dope into a fiber, drawing and drying the fiber. Polyacrylonitrile/SWNT composite macroscopic fibers have substantially higher modulus and reduced shrinkage versus a polymer fiber without SWNT. A polyacrylonitrile/SWNT fiber containing 10 wt % SWNT showed over 100% increase in tensile modulus and significantly reduced thermal shrinkage compared to a control fiber without SWNT. With 10 wt % SWNT, the glass transition temperature of the polymer increased by more than 40° C.

15 Claims, 10 Drawing Sheets

PUBLICATIONS

Sreekumar et al., "Polyacrylonitrile–Single Wall Carbon Nanotube Composite Fibers and Films," http://www.eps.org/aps/meet/MAR03/baps/abs/S2980004.html (Mar. 4, 2003).

Lam et al., "Super Carbon Fiber by Electrospinning of Single–Walled Carbon Nanotubes/Polyacrylonitrile Composite Nanofibers," *Polymer Preprints* 44:156–157 (2003).

Liu et al. "SWNT/PAN Composite Film–Based Supercapacitors," *Carbon* 41:2440–2442 (2003).

El–Aufy et al., "Carbon Nanotube Reinforced (PEDT/PAN) Nanocomposite for Wearable Electronics," *Polymer Preprints* 44:134–135 (2003).

Titchenal et al., "Next–Generation Carbon Fibers by Electrospinning of PAN and MWNT Nanocomposite," *Polymer Preprints* 44:115–116 (2003).

Pirlot et al., "Preparation and Characterization of Carbon Nanotube/Polyacrylonitrile Composites," *Advanced Engineering Materials* 4:109–114 (Mar. 2002).

Pirlot et al., "Surface Modifications of Carbon Nanotube/Polyacrylonitrile Composite Films by Proton Beams," *Chemical Physics Letters* 372:595–602 (Apr. 29, 2003).

Ko et al., "Electrospinning of Continuous Carbon Nanotube–Filled Nanofiber Yarns," *Adv. Mater.* 15:1161–1165 (Jul. 17, 2003).

Ali, "Carbon Nanotube Reinforced Carbon Nano Composite Fibrils by Electro–Spinning," Thesis submitted to the faculty of Drexel University (Oct. 2002).

Hwang et al., "Polarized Spectroscopy of Aligned Single–Wall Carbon Nanotubes," *Physical Review B* 62:R13 310–R13 313 (Nov. 15, 2000).

Harris et al., "An Assessment of the State–of–the–Art in the Design and Manufacturing of Large Composite Structures for Aerospace Vehicles," NASA Langley Research Center, Hampton, VA 23681, http://techreports.larc.nasa.gov/ltrs/PDF/2001/mtg/NASA–2001–22sampe–ceh.pdf (2001).

Liu et al., "Effect of Orientation on the Modulus of SWNT Films and Fibers," *Nano Letters* 3:647–650 (Mar. 29, 2003).

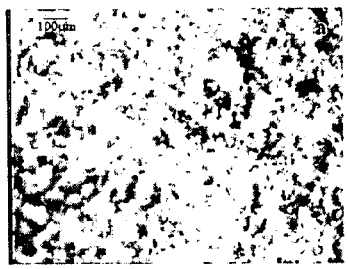 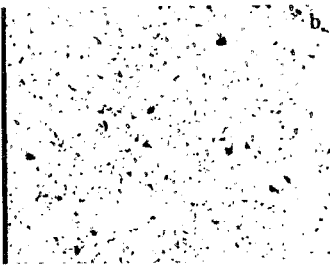 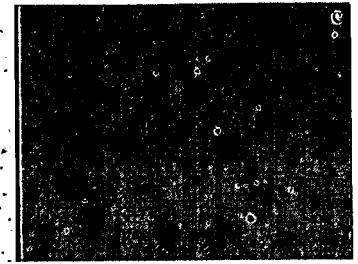
Figure 1A          Figure 1B          Figure 1C
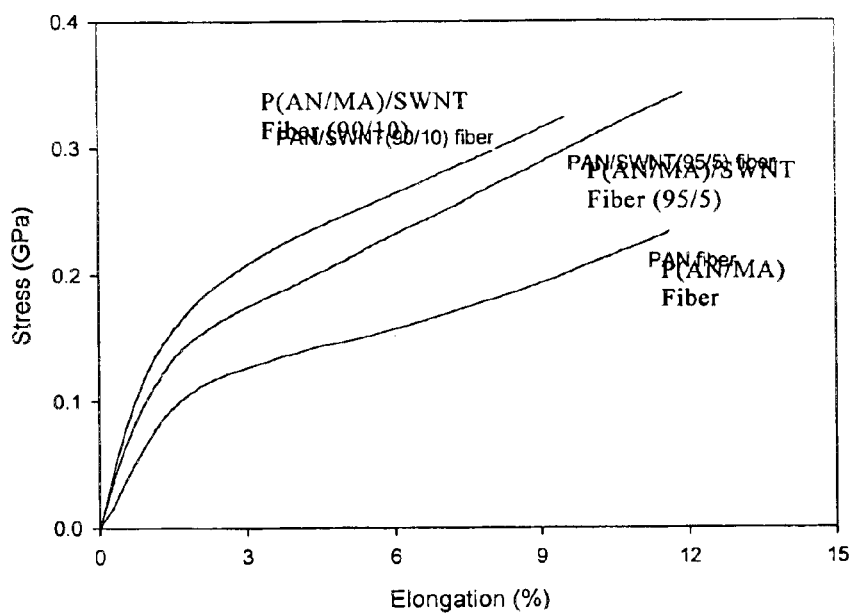
Figure 2

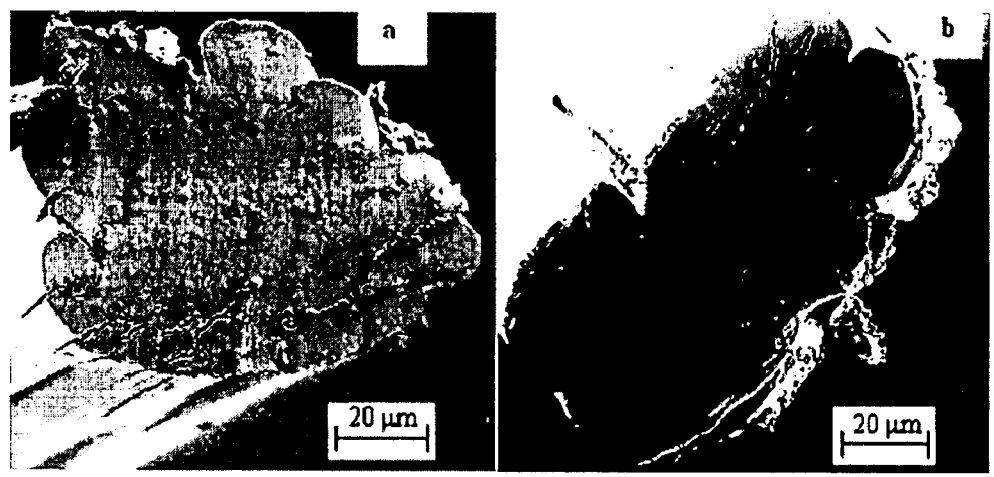
Figure 6A                    Figure 6B

MACROSCOPIC FIBER COMPRISING SINGLE-WALL CARBON NANOTUBES AND ACRYLONITRILE-BASED POLYMER AND PROCESS FOR MAKING THE SAME

CROSS-REFERENCE TO RELATED APPLICATION

This application claims priority from U.S. provisional application, Ser. No. 60/392,955, filed Jul. 1, 2002, which application is incorporated herein by reference.

This invention was made with United States Government support under Grant No. N00014-01-1-0657 awarded by the Office of Naval Research and partial support from Grant No. F49620-00-1-0147 awarded by the Air Force Office of Scientific Research. Government may have certain rights in the invention.

FIELD OF THE INVENTION

This invention relates generally to single-wall carbon nanotubes, more particularly to macroscopic fibers comprising single-wall carbon nanotubes and acrylonitrile-containing polymers.

BACKGROUND OF THE INVENTION

Polymers containing acrylonitrile are important commercial polymers for use in fibers for such applications as fabrics, carpets and carbon fibers. High performance acrylic fibers produced from polyacrylonitrile copolymers are used as precursors for carbon fibers. The tensile modulus of the final carbon fiber has a linear relationship with the modulus of the polyacrylonitrile precursor fiber.

Single-wall carbon nanotubes (SWNT), commonly known as "buckytubes," have exceptional and unique properties, including high tensile strength, high modulus, stiffness, thermal and electrical conductivity. SWNT are fullerenes consisting essentially of $sp^2$-hybridized carbon atoms typically arranged in hexagons and pentagons. Multi-wall carbon nanotubes are nested single-wall carbon cylinders and possess some properties similar to single-wall carbon nanotubes. However, since single-wall carbon nanotubes have fewer defects than multi-wall carbon nanotubes, the single-wall carbon nanotubes are generally stronger and more conductive.

However, the full potential of the properties of single-wall carbon nanotubes have not been fully realized when incorporated in other materials due to the difficulty of dispersing the nanotubes. The problems associated with dispersing single-wall carbon nanotubes are due largely to their insolubility in most common solvents and their propensity to rope together in SWNT bundles and be held tightly together by van der Waals forces. The lack of significant enhancement in mechanical properties in nanotube-polymer composites has been attributed to the weak interface between the nanotubes and the composite matrix. Therefore, methodology is needed to produce nanotube-polymer composites, and, in particular, fibers which capture the exceptional mechanical properties of single-wall carbon nanotubes. Fabrication of high modulus fibers containing single-wall nanotubes remains a major challenge.

SUMMARY OF THE INVENTION

In one embodiment, the present invention relates to a macroscopic fiber comprising single-wall carbon nanotubes and polymer, wherein the polymer is an acrylonitrile-containing polymer, and the fiber has a cross-sectional dimension of at least about 1 micron. In another embodiment, an acrylonitrile-containing polymer/SWNT macroscopic composite fiber is made by suspending SWNT in a solvent to form a SWNT-solvent suspension, admixing an acrylonitrile-containing polymer with the SWNT-solvent suspension to form a polymer-SWNT dope, spinning the polymer-SWNT dope to form a polymer-SWNT fiber, and drawing the polymer-SWNT fiber to form a macroscopic drawn polymer-SWNT fiber.

In another embodiment, a macroscopic fiber comprising SWNT and an acrylonitrile-containing polymer is prepared by mixing SWNT and an acrylonitrile-containing polymer in a solvent to form a polymer-SWNT dope, spinning the polymer-SWNT dope to form a polymer-SWNT fiber, and drawing the polymer-SWNT fiber to form a macroscopic drawn polymer-SWNT fiber.

In one embodiment of the invention, an acrylonitrile-containing polymer composite fiber containing about 10 wt % SWNT exhibited a 100% increase in tensile modulus and a significantly reduced thermal shrinkage as compared to a control fiber without SWNT. With 10 wt % SWNT incorporation in an acrylonitrile-containing polymer/SWNT composite, the glass transition temperature is shifted higher by about 40° C. relative to the unfilled polymer. In drawn fibers, SWNT provides a means for increasing the orientation and modulus of an acrylonitrile-containing polymer fiber.

High strength and high modulus fibers comprising single-wall carbon nanotubes are useful in a variety of applications, including, but not limited to carbon fiber production, fabrics for body armor, such as bullet-proof vests, and fibers for material reinforcement, such as in tire cord and in cement.

BRIEF DESCRIPTION OF THE DRAWINGS

FIG. 1A shows an optical micrograph of 150 mg SWNT dispersed in 100 g dimethyl acetamide (DMAc).

FIG. 1B shows an optical micrograph of 150 mg SWNT and 5 g poly(acrylonitrile-co-methyl acrylate) (P(AN/MA) copolymer) dispersed in 100 g DMAc.

FIG. 1C shows an optical micrograph of 150 mg SWNT and 15 g P(AN/MA) copolymer dispersed in 100 g DMAc.

FIG. 2 shows typical tensile curves for P(AN/MA) and P(AN/MA)/SWNT fibers.

FIG. 6A shows the cross-section of a P(AN/MA) copolymer fiber.

FIG. 6B shows the cross-section of a 95/5 P(AN/MA)/SWNT composite fiber.

DETAILED DESCRIPTION OF SPECIFIC EMBODIMENTS

Figure 3:
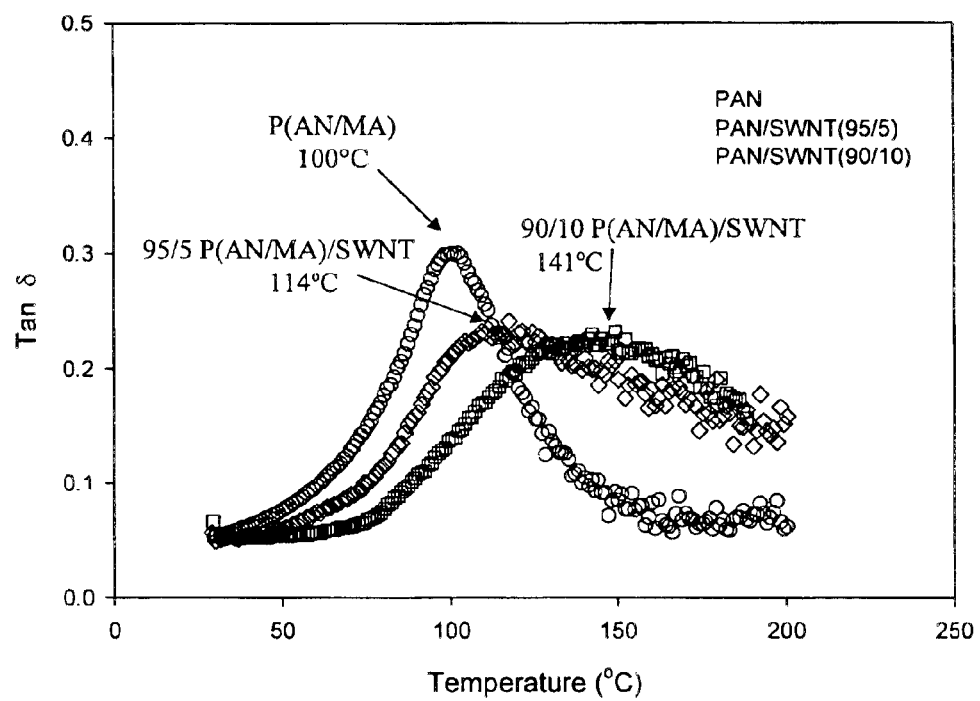
FIG. 3 shows plots of loss factor (tan δ) as a function of temperature for P(AN/MA) and P(AN/MA)/SWNT composite fibers.

The macroscopic fibers of this invention generally encompass drawn fibers having cross-sectional dimensions in the range of about 1 micron and about 100 microns, more typically in the range of about 1 micron and about 50 microns, and more typically in the range of about 10 microns and about 20 microns.

Single-wall carbon nanotubes can be made from any known means, such as by gas-phase synthesis from high temperature, high pressure carbon monoxide, catalytic vapor deposition using carbon-containing feedstocks and metal catalyst particles, laser ablation, arc method, or any other method for synthesizing single-wall carbon nanotubes. The single-wall carbon nanotubes obtained from synthesis are generally in the form of single-wall carbon nanotube powder.

In one embodiment, single-wall carbon nanotube powder is purified to remove non-nanotube carbon, such as amorphous carbon and metallic catalyst residues. Metals, such as Group VIB and/or VIIIB, are possible catalysts for the synthesis of single-wall carbon nanotubes. After catalysis, the metallic residues may be encapsulated in non-nanotube carbon, such as graphitic shells of carbon. The metallic impurities may also be oxidized through contact with air or by oxidation of the non-nanotube carbon during purification.

Purification can be done by any known means. Procedures for purification of single-wall carbon nanotubes are related in International Patent Publications "Process for Purifying Single-Wall Carbon Nanotubes and Compositions Thereof," WO 02/064,869, published Aug. 22, 2002, and "Gas Phase Process for Purifying Single-Wall Carbon Nanotubes and Compositions Thereof," WO 02/064,868 published, Aug. 22, 2002, and incorporated herein in their entirety by reference. In one embodiment, the nanotubes are purified by heating at 250° C. in air saturated with water vapor. The heating is done for a length of time so as to oxidize at least some of the non-nanotube carbon, and, may, to some extent, oxidize the metal impurities. The oxidation temperature can be in the range of 200° C. and about 400° C., preferably about 200° C. to about 300° C. The oxidation can be conducted in any gaseous oxidative environment, which can comprise oxidative gases, such as oxygen, air, carbon dioxide, and combinations thereof. The concentration of the oxidative gases can be adjusted and controlled by blending with nitrogen, an inert gas, such as argon, or combinations thereof. The duration of the oxidation process can range from a few minutes to days, depending on the oxidant, its concentration, and the oxidation temperature. After oxidatively heating the nanotubes, the nanotubes are treated with acid to remove metallic impurities. In one embodiment, the nanotubes are slurried in the acid, which can be a mineral acid, an organic acid, or combinations thereof. Examples of acids that could be used to treat and slurry the nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. The acid used can be a pure acid or diluted with a liquid medium, such as an aqueous and/or organic solvent. Generally, an aqueous solvent is preferred. Concentrated aqueous hydrochloric acid is preferred for removing metallic impurities. After acid treating, the acid and impurities are removed from the nanotubes by rinsing. The nanotubes can be rinsed with water, an organic solvent or a combination thereof.

The single-wall carbon nanotubes can be optionally derivatized with one or more functional groups. The carbon nanotubes can be derivatized on their ends or sides with functional groups, such as alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally interrupted with one or more heteroatom, and optionally substituted with one or more =O, or =S, hydroxy, an aminoalkyl group, an amino acid, or a peptide. Typically, the number of carbon atoms in the alkyl, acyl, aryl, aralkyl groups is in the range of 1 to about 30, and in some embodiments in the range of 1 to about 10.

The following definitions are used herein.

The term "alkyl" as employed herein includes both straight and branched chain radicals; for example methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof. The chain may be linear or cyclic, saturated or unsaturated, containing, for example, double and triple bonds. The alkyl chain may be interrupted or substituted with, for example, one or more halogen, oxygen, hydroxy, silyl, amino, or other acceptable substituents.

The term "acyl" as used herein refers to carbonyl groups of the formula —COR wherein R may be any suitable substituent such as, for example, alkyl, aryl, aralkyl, halogen; substituted or unsubstituted thiol; unsubstituted or substituted amino, unsubstituted or substituted oxygen, hydroxy, or hydrogen.

The term "aryl" as employed herein refers to monocyclic, bicyclic or tricyclic aromatic groups containing from 6 to 14 carbons in the ring portion, such as phenyl, naphthyl substituted phenyl, or substituted naphthyl, wherein the substituent on either the phenyl or naphthyl may be for example $C_{1-4}$ alkyl, halogen, $C_{1-4}$ alkoxy, hydroxy or nitro.

The term "aralkyl" as used herein refers to alkyl groups as discussed above having an aryl substituent, such as benzyl, p-nitrobenzyl, phenylethyl, diphenylmethyl and triphenylmethyl.

The term "aromatic or non-aromatic ring" as used herein are preferably 5–8 membered aromatic and non-aromatic rings uninterrupted or interrupted with one or more heteroatom, for example O, S, SO, $SO_2$, and N, or the ring may be unsubstituted or substituted with, for example, halogen, alkyl, acyl, hydroxy, aryl, and amino. Said heteroatom and substituent may also be substituted with, for example, alkyl, acyl, aryl, or is aralkyl.

The term "linear or cyclic" when used herein includes, for example, a linear chain which may optionally be interrupted by an aromatic or non-aromatic ring. Cyclic chain includes, for example, an aromatic or non-aromatic ring which may be connected to, for example, a carbon chain which either precedes or follows the ring.

The term "substituted amino" as used herein refers to an amino which may be substituted with one or more substituents, for example, alkyl, acyl, aryl, aralkyl, hydroxy, and hydrogen.

The term "substituted thiol" as used herein refers to a thiol which may be substituted with one or more substituents, for example, alkyl, acyl, aryl, aralkyl, hydroxy, and hydrogen.

In one embodiment, the SWNT are optionally purified. The optionally purified SWNT are dried. Drying can be done in a vacuum or in a dry gaseous environment, such as air, carbon dioxide, nitrogen, inert gas, or combinations thereof. Preferably, the drying is done in a vacuum or a dry gas environment without the presence of water vapor.

Suitable drying temperatures are chosen to remove adsorbed moisture. In a vacuum environment, drying temperatures of at least 100° C. are suitable. Preferably, the drying temperature is about 110° C.

Drying time is dependent on the drying temperature and drying environment. The preferred drying time is chosen to remove adsorbed moisture from the nanotubes.

After drying, the nanotubes are kept free from moisture, such as contained in ambient air, and in one embodiment, dispersed in a solvent. Preferably, the solvent used is also a solvent that can be used to solubilize acrylonitile polymers and copolymers. Dimethyl formamide (DMF) and dimethyl acetamide (DMAc) are examples of solvents that can be used to suspend or solubilize polyacrylonitrile polymers and copolymers. Other examples of organic compounds solvents that can be used to suspend polyacrylonitrile polymers and copolymers include such solvents as dimethylsulfoxide (DMSO), ethylene carbonate, dioxanone, chloroacetonitrile, dimethyl sulfone, propylene carbonate, malononitrile, succinonitrile, adiponitrile, γ-butyrolactone, acetic anhydride, ε-caprolactam, bis(2-cyanoethyl)ether, bis(4-cyanobutyl)sulfone, chloroacetonitrile/water, chloroacetonitrile, cyanoacetic acid, dimethyl phosphate, tetramethylene sulfoxide, glutaronitrile, succinonitrile, N-formylhexamethyleneimine, 2-hydroxyethyl methyl sulfone, N-methyl-β-cyanoethylformamide, methylene dithiocyanate, N-methyl-α,α,α,-trifluoroacetamide, 1-methyl-2-pyridone, 3,4-nitrophenol, nitromethane/water (94:6), N-nitrosopiperidine, 2-oxazolidone, 1,3,3,5-tetracyanopentane, 1,1,1-trichloro-3-nitro-2-propane, and p-phenol-sulfonic acid. Other examples of solvents include, but are not limited to, inorganic solvents, such as aqueous concentrated acids, e.g. concentrated nitric acid (approximately 69.5 wt % $HNO_3$) and concentrated sulfuric acid (approximately 96 wt % $H_2SO_4$), and concentrated salt solutions, e.g. zinc chloride, lithium bromide and sodium thiocyanate.

Mixing means to disperse the nanotubes in the solvent include, but are not limited to, sonication, such as with a bath sonicator, homogenation, such as with a bio-homogenizer, mechanical stirring, such as with a magnetic stirring bar, and combinations thereof. Other mixing means can include high shear mixing techniques.

In one embodiment, heat can be applied to facilitate dispersing the nanotubes. At atmospheric pressure, heat can be applied up to the boiling point of the solvent.

The time of mixing is dependent on various parameters, including, but not limited to, the solvent, temperature of the mixture, concentration of the nanotubes and mixing means. The mixing time is the time needed to prepare a generally homogeneous nanotube-solvent suspension or dispersion.

After dispersing the SWNT in the selected solvent to form a nanotube-solvent suspension, some of the solvent can optionally be removed. Solvent removal can be achieved by any known means, such as with the application of heat, application of a vacuum, ambient solvent evaporation, or combinations thereof. The time and temperature needed to adjust the concentration of the nanotube-solvent suspension are dependent on various parameters, including, but not limited to, the particular solvent used, the amount of solvent to be removed, and the nature of the solvent.

In one embodiment, an acrylonitrile-containing polymer is added to the nanotube-solvent suspension. Acrylonitrile-containing polymers include copolymers containing acrylonitrile monomer and at least one other monomer. The term "copolymer" also includes terpolymers and other polymers having more than two different monomers. Examples of acrylonitrile-containing polymers include, but are not limited to, polyacrylonitrile, poly(acrylonitrile-methyl acrylate), poly(acrylonitrile-methacrylic acid), poly(acrylonitrile-acrylic acid), poly(acrylonitrile-itaconic acid), poly(acrylonitrile-methyl methacrylate), poly(acrylonitrile-itaconic acid-methyl acrylate), poly(acrylonitrile-methacrylic acid-methyl acrylate), poly(acrylonitrile-vinyl pyridine), poly(acrylonitrile-vinyl chloride), poly(acrylonitrile-vinyl acetate), and combinations thereof. A preferred acrylonitrile-containing polymer is poly(acrylonitrile-co-methyl acrylate), designated as P(AN/MA) herein. For carbon fiber applications, acrylonitrile copolymers containing an acid monomer (e.g. acrylic acid, methacrylic acid, itaconic acid) are preferred.

The relative amounts of comonomer components in an acrylonitrile copolymer, as well as the molecular weight of the acrylonitrile-containing polymer, are dependent on the end-use application. For applications involving carbon fiber precursors, the acrylonitrile monomer incorporation is generally greater than about 85 wt %. For many fiber applications, the acrylonitrile monomer incorporation can be in the range of about 35 wt % and about 85 wt %. The molecular weight of acrylonitrile-containing polymer is highly dependent on the desired processing conditions and end-use application. Typically, the molecular weight range of an acrylonitrile-containing polymer is in the range of about 30,000 g/mole and about 200,000 g/mole. For carbon fiber applications, the molecular weight of the acrylonitrile polymer is generally in the range of about 70,000 g/mole and about 200,000 g/mole. However, there are other applications, in which the molecular weight of the acrylonitrile-containing polymer could range below 30,000 g/mole and above 200,000 g/mole and into the millions, for example, ultra-high molecular weight acrylonitrile-containing polymers.

In one embodiment, an acrylonitrile-methyl acrylate copolymer with a 90:10 AN:MA comonomer ratio and a $M_n$ molecular weight of about 100,000 g/mole is an example of a polymer suitable for preparing the macroscopic fiber of present invention.

The polymer concentration in the particular solvent is dependent on various factors, one of which is the molecular weight of the acrylonitrile-containing polymer. The concentration of the polymer solution is selected to provide a viscosity conducive to the selected fiber spinning technique. Generally, with respect to the preparation of a polymer solution, the polymer molecular weight and polymer concentration are inversely related. In other words, the higher the molecular weight of the polymer, the lower the concentration of polymer needed to obtain the desired viscosity. For example, solutions up to about 25 wt % could be made with an acrylonitrile polymer having a molecular weight on the order of about 50,000 g/mole. Likewise, solutions up to about 15 wt % polymer could be made with an acrylonitrile-containing polymer having a molecular weight of about 100,000 g/mole. Likewise, solutions up to about 5 wt % polymer could be made with acrylonitrile-containing polymer having a molecular weight of about 1,000,000 g/mole. The solution concentrations would also depend on, among other variables, the particular polymer composition, the particular solvent, and solution temperature.

In one embodiment, the acrylonitrile-containing polymer is added to a SWNT-solvent suspension and homogenized to form an optically homogeneous polymer-SWNT solution or suspension, also called "dope". Preferably, the polymer is in a form, such as a powder or small granules, to facilitate solubilization of the polymer. The polymer can be added all at one time, gradually in a continuous fashion or stepwise to make a generally homogeneous solution. Mixing of the polymer to make an optically-homogeneous solution can be done by any known means, such as mechanical stirring, such as with a magnetic stirrer, sonication, homogenization, high shear mixing, single-or multiple-screw extrusion, or combinations thereof.

In another embodiment of the present invention, the single-wall carbon nanotubes and the polymer can be mixed with the solvent simultaneously rather than stepwise. In such case, the acrylonitrile-containing polymer, SWNT and solvent are mixed to form an optically homogenous polymer-SWNT dope. Mixing of the nanotubes and polymer to make an optically-homogeneous solution can be done by any known means, such as mechanical stirring, such as with a magnetic stirrer, sonication, homogenization, high shear mixing, single- or multiple-screw extrusion, or combinations thereof.

After preparation of the generally homogeneous polymer-SWNT dope, the dope can be spun into a polymer-SWNT fiber by any known means of making drawable, macroscopic fibers. Examples of techniques for making drawable fibers include, but are not limited to, gel spinning, wet spinning, dry spinning and dry-jet wet spinning. After the polymer is extruded through the spinneret, the fiber is drawn in a manner consistent with the particular spinning technique used. For dry-jet wet spinning, the fiber is coagulated and cooled under tension in one or more liquid baths containing various amounts of the solvent used in the dope and a non-solvent, such as water. Generally, the initial baths will have a higher solvent-to-non-solvent ratio than the later baths. The last bath can contain only non-solvent. The fiber is then heated above its Tg, e.g. to approximately the extrusion temperature, in another bath. The tension on the heated fiber is provided by a take-up roll, the speed of which is adjusted to achieve the desired draw ratio. The spinning and drawing causes the polymer molecules and nanotubes to be substantially aligned. Some of the nanotubes and polymer chains are in intimate contact and can intertwine; and as a result of this contact, an acrylonitrile-containing polymer/SWNT composite fiber is produced that either does not fibrillate or exhibits only minimal amounts of fibrillation.

In one embodiment of the invention, a polymer-SWNT fiber is prepared by dry-jet wet spinning a polymer-nanotube dope. In this embodiment, the polymer-nanotube dope is heated for a length of time prior to spinning through a spinneret. The fiber passes through the spinneret and through an air gap before entering a wet coagulation bath. In one embodiment, the fiber enters multiple coagulation baths. The coagulation baths contain varying amounts of the same solvent used in the polymer-nanotube dope and water. In each subsequent bath, the ratio of solvent to water is decreased such that the final bath contains only water. In each bath, tension is applied by adjusting a take-up roll speed. The temperature of each bath is selected to achieve the desired effect. For example, the first bath temperature is selected to coagulate and rapidly cool the fiber, and, as such, is set at a temperature lower than the extrusion temperature. In order to draw the fiber, the temperature of the fiber is elevated to a temperature above the polymer's glass transition temperature (e.g. above about 95° C. for polyacrylonitrile), which can be done by adjusting the bath temperature. In one embodiment, the fiber is drawn in a heated bath containing a high boiling point solvent, such as glycerol (b.p. 290° C.). At this elevated temperature, the take-up roll speed can be adjusted to elongate the fiber to achieve the desired draw ratio of the fiber. Typical draw ratios for wet spinning, dry spinning and dry-jet wet spinning are typically in the range of 10 times to 20 times the length of the undrawn fiber. Typical draw ratios for gel spinning are in the range of about 30 times and about 100 times the length of the undrawn fiber. In one embodiment, the macroscopic drawn fiber has a length in the range of about 2 times and about 100 times the length of the polymer-SWNT fiber before drawing.

After the fiber exits the final bath, it is dried under tension. Polyacrylonitrile-containing polymers can be dried up to about 170° C. in a variety of media, such as, but not limited to, air, nitrogen, inert gases and combinations thereof. A typical drying temperature is about 120° C. for a time on the order of seconds. The drying time can vary depending on a number of factors, including, but not limited to, the size of the fiber, the number of fibers in the tow, the solvent used in the dope of the fiber, and the drying temperature. Tow is a term that means a multifilament fiber formed from the spinning of multiple filaments simultaneously. In certain embodiments, the single-wall carbon nanotubes are present in the drawn polymer-SWNT fiber in a range of about 0.001 wt % and about 50 wt %, about 1 wt % and about 25 wt %, or about 5 wt % and about 15 wt %. At least some of the single-wall carbon nanotubes are present in the macroscopic fiber as ropes of single-wall carbon nanotubes.

Drawn acrylonitrile-containing polymer/SWNT composite macroscopic fibers have exhibited higher tensile and storage modulus, higher solvent resistance, greater alignment and tensile strength than a comparable fiber without SWNT.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This method demonstrates the preparation of a spinning dope of pure polyacrylonitrile-co-methyl acrylate (P(AN/

MA) in dimethyl acetamide (DMAc) solvent. Total solids were 15 g in 100 g DMAc.

100 g DMAc was added to a 250-ml sample bottle and cooled to 0 to 5° C. using an ice jacket. About 30 mg oxalic acid, which is about 0.2% of the polymer weight, was added as an anti-gelling agent. 15 g finely powdered P(AN/MA) polymer from Sigma Aldrich, having a 90:10 acrylonitrile:methyl acrylate comonomer ratio and a $M_n$ molecular weight of about 100,000 g/mole, was added step-wise to the DMAc in small quantities under constant stirring. The stirring was continued until the all of the polymer was dissolved and the solution was clear and optically transparent. This solution was used to make the polyacrylonitrile (P(AN/MA) control fiber.

EXAMPLE 2

Preparation of PAN-SWNT Solutions in DMAc

This example demonstrates the preparation of spinning dopes containing poly(acrylonitrile-co-methyl acrylate) (P(AN/MA)) and single-wall carbon nanotubes (SWNT) at different P(AN/MA):SWNT weight ratios in DMAc. For each P(AN/MA):SWNT ratio prepared in this example, the acrylonitrile copolymer, obtained from Sigma Aldrich, contained a 90:10 AN:MA comonomer ratio and a $M_n$ molecular weight of about 100,000 g/mole. For each preparation in this example, single-wall carbon nanotubes (Lot No. HPR87), were obtained from Rice University, where they were made in a high temperature, high pressure, all-gas phase process through the disproportionation of carbon monoxide (CO) to SWNT and $CO_2$ using iron as the transition metal catalyst. Furthermore, for each preparation in this example, sonication was done with a bath sonicator (Cole-Parmer Model 8891R-DTH), and homogenation was done with a bio-homogenizer (Biospec Products Inc., Bartlesville, Okla., Model 133/1281-0). Total solids for each polymer/SWNT combination were 15 g in 100 g DMAc.

99:1 P(AN/MA):SWNT in DMAc 0.15 g purified and dried SWNT (Lot HPR87) and 30 mg oxalic acid were mixed with 250 mls DMAc and sonicated two hours using a bath sonicator. During sonication, the mixture was stirred every half hour with a bio-homogenizer for at least 2 to 3 minutes. The solution was then transferred to a round bottom flask. The excess solvent was boiled off (at 166° C.) to give a final volume of about 107 mls, which weighed nearly 100 g. The dispersion obtained did not settle for several days, however, optical microscopy studies showed some nanotube inhomogeneity, as seen in FIG. 1A. To this dispersion, 5 g P(AN/MA) copolymer was added stepwise in small quantities and stirred well until dissolved. This solution, shown in FIG. 1B, had better nanotube dispersion than the SWNT-only suspension. To the resulting solution, 9.85 g more P(AN/MA) copolymer was added, stirred and dissolved to get a solution consisting of 100 g DMAc, 14.85 g P(AN/MA) and 0.15 g SWNT, shown in FIG. 1C. Compared to FIGS. 1A and 1B, the solution shown in FIG. 1C is very homogeneous.

95:5 P(AN/MA):SWNT in DMAc 0.75 g purified, dried SWNT and 30 mg oxalic acid was mixed with 250 mls DMAc and sonicated for two hours using a bath sonicator. During sonication, the mixture was stirred every half hour with a bio-homogenizer for at least 2–3 minutes. The solution was then transferred to a round bottom flask and the excess solvent was boiled off (at 166° C.) to a give a final volume of about 107 mls, which weighed nearly 100 g. The dispersion did not settle for several days, however, optical microscopic studies show the solution was not homogenous. To this dispersion 5 g P(AN/MA) copolymer was added stepwise in small quantities and stirred well to dissolve. This solution showed a better dispersion of nanotubes. To the resulting solution 9.25 g more P(AN/MA) copolymer was added and stirred and dissolved to get a solution consisting of 100 g DMAc, 14.25 g P(AN/MA) and 0.75 g nanotubes. The resulting solution was very homogeneous.

90:10 P(AN/MA):SWNT in DMAc 1.5 g purified, dried SWNT and 27 mg oxalic acid were mixed with 250 mls DMAc and sonicated for two hours using a bath sonicator. During sonication, the mixture was stirred every half hour with a bio-homogenizer for at least 2–3 minutes. The solution was then transferred to a round bottom flask and the excess solvent boiled off (at 166° C.) to give a final volume of about 107 mls, which weighed nearly 100 g. To this dispersion, 5 g P(AN/MA) copolymer was added stepwise in small quantities and stirred well until complete dissolved. To the resulting solution, 8.5 g more copolymer was added, stirred and dissolved to get a solution consisting of 100 g DMAc, 13.5 g P(AN/MA) and 1.5 g nanotubes.

85:15 P(AN/MA):SWNT in DMAc 2.25 g purified and dried SWNT and 25 mg oxalic acid were mixed with 250 mls DMAc and sonicated for two hours using a bath sonicator. During sonication, the mixture was stirred every half hour with a bio-homogenizer for at least 2–3 minutes. The solution was then transferred to a round bottom flask and the excess solvent boiled off (at 166° C.) to give a final volume of about 107 mls, which weighed nearly 100 g. To this dispersion, 5 g P(AN/MA) copolymer was added stepwise in small quantities and stirred well to dissolve. This solution showed a better nanotube dispersion than the dispersion without P(AN/MA). To the resulting solution, 7.75 g more copolymer was added, stirred and dissolved to get a solution consisting of 100 g DMAc, 12.75 g P(AN/MA) and 2.25 g nanotubes.

EXAMPLE 3

This example demonstrates the preparation of polyacrylonitrile-co-methyl acrylate, P(AN/MA), in dimethyl formamide (DMF) without nanotubes. The total solids are 15 g in 100 g DMF.

100 g DMF was added to a 250-ml bottle and cooled to 0 to 5° C. using an ice jacket. About 30 mg oxalic acid, about 0.2% of the polymer weight, was added as an anti-gelling agent. 15 g finely powdered P(AN/MA) copolymer (90:10 AN:MA comonomer ratio and $M_n$~100,000 g/mole obtained from Sigma Aldrich) was added stepwise in small quantities under constant stirring. The stirring was continued until the entire polymer was dissolved and formed a clear, transparent solution. This solution was used make a control polyacrylonitrile (PAN) fiber.

EXAMPLE 4

Preparation of PAN-SWNT Solution in DMF

This example demonstrates the preparation of spinning dopes containing poly(acrylonitrile-co-methyl acrylate) (P(AN/MA)) and single-wall carbon nanotubes (SWNT) at different P(AN/MA):SWNT weight ratios in DMF. In each case in this example, the acrylonitrile copolymer, obtained from Sigma Aldrich, had a 90:10 AN:MA comonomer ratio and a $M_n$ molecular weight of about 100,000 g/mole. In this example, the single-wall carbon nanotubes were prepared by different processes. In each preparation in this example, sonication was done with a bath sonicator (Cole-Parmer Model 8891R-DTH), and homogenation was done with a bio-homogenizer (Biospec Products Inc., Bartlesville, Okla., Model 133/1281-0). Total solids for each polymer/SWNT combination were 15 g in 100 g DMF.

95:5 P(AN/MA):HIPCO® SWNT in DMF

HIPCO® single-wall carbon nanotubes (SWNT Lot HPR 87) were obtained from Rice University where they were made in a high temperature, high pressure, all-gas phase process through the disproportionation of carbon monoxide (CO) to SWNT and $CO_2$ using iron as the transition metal catalyst.). (HIPCO is a registered trademark of Carbon Nanotechnologies, Inc., Houston, Tex.) 0.75 g purified, dried nanotubes and 30 mg oxalic acid, which is about 0.2 wt % of the polymer, were mixed with 250 mls DMF and sonicated for two hours using a bath sonicator. During sonication, the mixture was stirred every half hour with a bio-homogenizer for at least 2 to 3 minutes. The solution was then transferred to a round bottom flask and the excess solvent was boiled off to a final volume of about 107 ml, which weighed nearly 100 g. The dispersion obtained did not settle for several days, however, optical microscopy studies showed nanotube inhomogeneity. To this dispersion 5 g P(AN/MA) copolymer was added stepwise in small quantities and stirred well to dissolve. This solution showed better nanotube dispersion than without added polymer. To the resulting solution, 9.25 g more copolymer was added, stirred and dissolved to get a solution consisting of 100 g DMF, 14.25 g P(AN/MA) and 0.75 g nanotubes.

95:5 P(AN/MA):Laser Oven SWNT in DMF

Single-wall carbon nanotubes (SWNT Lot CNI PO 42600s) were obtained from Carbon Nanotechnologies, Inc., Houston, Tex., where they were prepared by a laser oven method using a graphite target and a nickel-cobalt catalyst. 0.75 g purified, dried nanotubes and 30 mg oxalic acid, which was about 0.2 wt % of the polymer, were mixed with 250 mls DMF and sonicated for two hours using a bath sonicator. During sonication, the mixture was stirred every half hour with a bio-homogenizer for at least 2–3 minutes. The solution was then transferred to a round bottom flask and the excess solvent boiled off to get a final volume of about 107 ml, which weighed nearly 100 g. The dispersion obtained did not settle for several days, however, optical microscopy studies showed that the solution was not homogenous. To this dispersion, 5 g P(AN/MA) copolymer was added stepwise in small quantities and stirred well until dissolution. This solution showed a better dispersion of nanotubes. To the resulting solution, 9.25 g more copolymer was added, stirred and dissolved to get a solution consisting of 100 g DMF, 14.25 g P(AN/MA) and 0.75 g nanotubes.

93:7 P(AN/MA):UNPURIFIED HIPCO® SWNT in DMF

Single-wall carbon nanotubes (SWNT Lot HPR 87) were obtained from Rice University where they were made in a high temperature, high pressure, all-gas phase process through the disproportionation of carbon monoxide (CO) to SWNT and $CO_2$ using iron as the transition metal catalyst. 1.05 g dried, unpurified nanotubes and 30 mg oxalic acid were mixed with 250 mls DMF and sonicated for two hours using a bath sonicator. During sonication, the mixture was stirred every half hour with a bio-homogenizer for at least 2–3 minutes. The solution was then transferred to a round bottom flask and the excess solvent boiled off to produce a final volume of about 107 mls, which weighed nearly 100 g. The dispersion did not settle for several days, however, optical microscopy studies showed that the solution was not homogenous. To the dispersion, 5 g P(AN/MA) copolymer was added stepwise in small quantities and stirred well until dissolved. The nanotubes of the resulting mixture were better dispersed than the nanotube dispersion without polymer. To the resulting mixture, 8.95 g more copolymer was added, stirred and dissolved to get a solution, or dope, consisting of 100 g DMF, 13.95 g P(AN/MA) and 1.05 g nanotubes. The final dispersion obtained was very homogeneous and free from any solid chunks.

EXAMPLE 5

This example demonstrates the preparation of fiber from the P(AN/MA) and P(AN/MA)/SWNT dopes made in Examples 1, 2, 3, and 4. All fibers were prepared by dry-jet wet spinning using a spinning machine manufactured by Bradford University Research Ltd. having a single hole spinneret of 500-$\mu$m diameter. Each dope was maintained at 80° C. and filtered through a 635-mesh (20-$\mu$m) stainless steel filter pack (from TWP Inc.) prior to spinning. The air gap (distance between the spinneret orifice and the liquid surface in the first coagulation bath) was about 5 cm. The volumetric throughput rate (Q) was 0.27 ml/min/hole to obtain a linear jet velocity <V> of 1.38 m/min. The first take-up roll speed, V, was maintained at 1.4 m/min to give a jet stretch, <V>/V, of nearly equal to 1. The ram speed was maintained at 0.5 mm/min. Standard spinning conditions are given in Table 1. (Draw ratio is indicated by the symbol $\lambda$. The solvent in the baths were DMAc for the DMAc-based dopes of Examples 1 and 2 and DMF for the DMF-based dopes of Examples 3 and 4.)

TABLE 1

| I Bath (Coagulation bath) | | |
|---|---|---|
| Composition | 60/40; Solvent/$H_2O$ | |
| Temperature | 30° C. | |
| Take-up roll speed | 1.4 m/min. | |
| II Bath | | |
| Composition | 10/90; Solvent/$H_2O$ | |
| Temperature | 30° C. | |
| Take-up roll speed | 1.4 m/min. | $\lambda_1 = 1.0$ |
| III Bath | | |
| Composition | 0/100; Solvent/$H_2O$ | |
| Temperature | 90 ± 2° C. | |
| Take-up roll speed | 6.4 m/min. | $\lambda_2 = 4.6$ |
| Drying | | |
| Heater plate temperature | 120° C. | |
| Winding speed | 6 m/min. | $\lambda_3 = 0.94$ |
| Total draw ratio (TDR) = | 1.0 × 4.6 × 0.94 = 4.3 | |

The total draw ratio ($\lambda_1 \times \lambda_2 \times \lambda_3$) for the fibers made from P(AN/MA) and P(AN/MA)/SWNT dopes containing DMAc in this example was 4.3. Generally, higher draw ratios are typically used with dry-jet wet spinning. Typically, draw ratios of 10 to 20 times the undrawn fiber are used with this spinning method. In case of P(AN/MA)/SWNT composite fibers, higher draw ratios could be achieved with dopes containing 1 and 5 wt % SWNT versus those containing higher concentrations of SWNT.

EXAMPLE 6

Tensile and dynamic mechanical properties of fibers formed from the P(AN/MA) dope made by the procedures of Example 1 and P(AN/MA)/SWNT in DMAc dopes made by the procedures in Example 2 were measured using a Rheometrics RSA III solids analyzer. The gauge length was 25 mm and the crosshead speed was 10 mm/min.

Typical tensile curves for the fibers of P(AN/MA) and P(AN/MA)/SWNT composites are given in FIG. 2; and measured tensile properties are listed in Table 2.

TABLE 2

Mechanical Properties of P(AN/MA) and P(AN/MA)/SWNT composite fibers

| Fiber | Draw Ratio | Tensile Strength (GPa) | Elongation at break (%) | Initial Tensile Modulus (GPa) |
|---|---|---|---|---|
| P(AN/MA) | 4.3 | 0.23 | 11.6 | 7.5 |
| P(AN/MA)/SWNT (1 wt % SWNT; HPR 87) | 4.3 | 0.25 | 14.3 | 8.0 |
| P(AN/MA)/SWNT (5 wt % SWNT; HPR 87) | 4.3 | 0.352 | 11.3 | 13.4 |
| P(AN/MA)/SWNT (10 wt % SWNT; HPR 87) | 4.3 | 0.33 | 9.9 | 16.3 |

The table shows that the tensile strength and modulus are improved by the incorporation of SWNT. Compared to the P(AN/MA) control fiber, the P(AN/MA) fibers containing 5 wt % SWNT showed enhanced mechanical properties, tensile strength and initial modulus. P(AN/MA) fibers containing 10% SWNT showed an increase in modulus of over 100% and an increase in tensile strength of over 40% versus the P(AN/MA) control fiber.

Dynamic mechanical tests were done with a Rheometrics Scientific's solids analyzer (RSA III) at a frequency of 10 Hz at a heating rate of 5° C./min. (Fiber shrinkage was determined using TA Instruments thermomechanical analyzer (TMA 2940) at 0.38 MPa pretension. Fiber cross-sectional areas were determined by weighing known lengths of each fiber. The average densities of the composite fibers were calculated from the component densities and weight fractions. The densities used for the components were 1.18 g/cm$^3$ for P(AN/MA) and 1.3 g/cm$^3$ for the single-wall carbon nanotubes. Other properties determined for the P(AN/MA) and P(AN/MA)/SWNT composites are given in Table 3.

TABLE 3

Properties of P(AN/MA) and P(AN/MA)/SWNT composites

| Fiber | Fiber cross-sectional area (cm$^2$) | $T_g$ (° C.) |
|---|---|---|
| P(AN/MA) | 4.4 × 10$^{-5}$ | 100 |
| P(AN/MA)/SWNT (5 wt % SWNT; HPR 87) | 3.9 × 10$^{-5}$ | 114 |
| P(AN/MA)/SWNT (10 wt % SWNT; HPR 87) | 4.9 × 10$^{-5}$ | 141 |

FIG. 3 shows the loss factor, tan δ, as a function of temperature for the control P(AN/MA) and 95/5 and 90/10 P(AN/MA)/SWNT composite drawn fibers. The temperature at the maximum tan δ is indicative of the glass transition temperature Tg. The 95/5 and 90/10 P(AN/MA)/SWNT composite drawn fibers had $T_g$s that were 114° C. and 141° C., i.e., about 14° C. and more than 40° C. higher, respectively, than the P(AN/MA) control fiber. The tan δ peaks for the P(AN/MA)/SWNT composites, besides being shifted to higher temperature, were also significantly lower in amplitude and broader than the P(AN/MA) control. Although not meant to be held by theory, the broadening of the tan δ peak and shift to higher temperature may be attributed a more constrained motion of the polymer molecules in contact or near SWNT in the polymer-SWNT composites. The higher glass transition temperatures in the composites are consistent with the composites' higher modulus retention at elevated temperatures with respect to the P(AN/MA) control.

Figure 4:
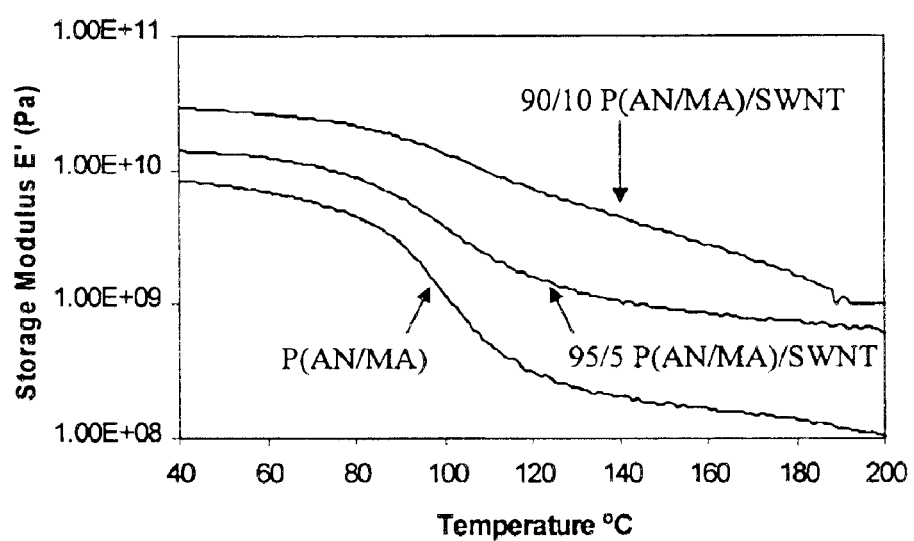
FIG. 4 shows plots of storage modulus (E') of P(AN/MA) and P(AN/MA)/SWNT composite fibers as a function of temperature.

Higher modulus retention is important in many applications. For example, fiber having a high modulus above 120° C. could be useful in such applications as tire reinforcement. FIG. 4 shows plots of storage modulus for the 90/10 P(AN/MA)/SWNT composite and the P(AN/MA) control as a function of temperature. At room temperature, the storage modulus of the 90/10 P(AN/MA)/SWNT composite gave a storage modulus that was twice that of the P(AN/MA) control. This doubling of modulus is consistent with the higher tensile modulus measured at constant strain and given in Table 2. At the higher temperatures of 120° C. and 150° C., the storage modulus of the 90/10 P(AN/MA)/SWNT composite was 13 times and 12 times that of the P(AN/MA) control, respectively. The increase in storage modulus is indicative of the reinforcing effect of SWNT in P(AN/MA)/SWNT composites.

Figure 5:
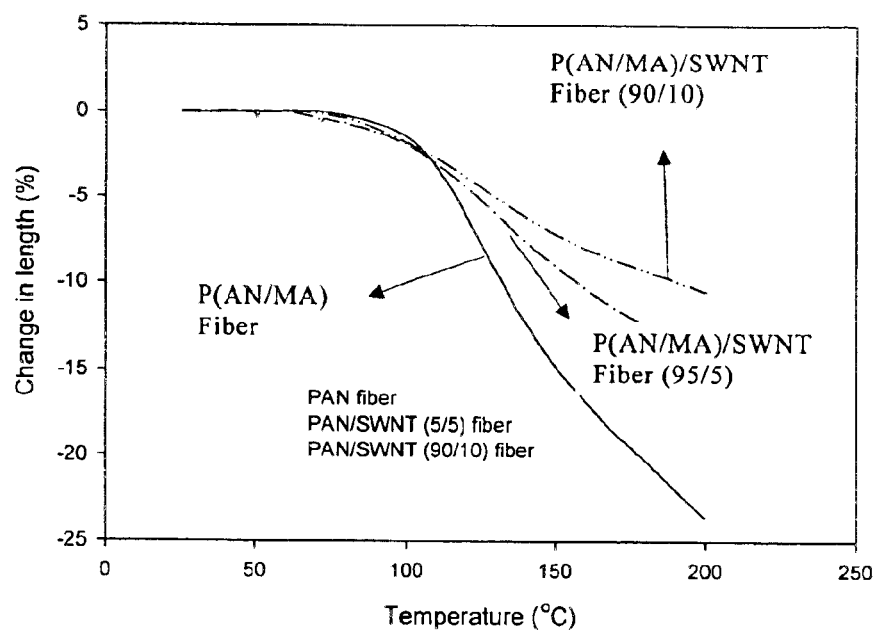
FIG. 5 shows thermal shrinkage (measured at 0.38 MPa stress) in P(AN/MA) and P(AN/MA)/SWNT composite fibers as a function of temperature.

Thermal shrinkage in air was measured for P(AN/MA)/SWNT) composites and P(AN/MA) control as a function of temperature and the curves are shown in FIG. 5. At 200° C., the shrinkage in the P(AN/MA)/SWNT composite fibers was nearly half of that of the P(AN/MA) control fiber. In contrast to the P(AN/MA) control fiber, the polymer molecules in the P(AN/MA)/SWNT composite fibers have SWNT in close contact and/or entangled with them, and, as such, are not as free to shrink as they are without nanotube incorporation.

The reduced shrinkage in P(AN/MA)/SWNT fibers may be useful for carbon fiber processing, in which stabilization of the polyacrylonitrile precursor fiber is typically done between 200° C. and 300° C. in an oxidative environment. To obtain high modulus carbon fibers, stabilization is done under tension to minimize shrinkage during stabilization. Because of their reduced shrinkage, fibers comprising acrylonitrile-containing polymers and SWNT could reduce the tension requirement in the stabilization process for making carbon fibers from polyacrylonitrile polymers, produce carbon fibers with higher orientation and modulus, or a combination thereof.

Scanning electron microscope photographs of the fiber cross-sections of P(AN/MA) control and P(AN/MA)/SWNT composite are shown in FIGS. 6A and 6B. Although both fibers were spun through the same round-hole spinneret, the P(AN/MA)/SWNT composite fiber was more distorted from round, i.e. more rectangular or oval, than the P(AN/MA) control fiber without SWNT. Both fibers show significant transverse cracks resulting from the counter diffusion of solvent and the non-solvent. The cross-sectional morphology of the spun fibers depends on the fiber coagulation rate, and the coagulation rate depends on the temperature and composition of the coagulation baths as well as that of the polymer solution.

Figure 7A:
FIGS. 7A, 7B, and 7C show SEM micrographs showing fracture behavior of P(AN/MA) and P(AN/MA)/SWNT composite fibers.
Figure 7B:
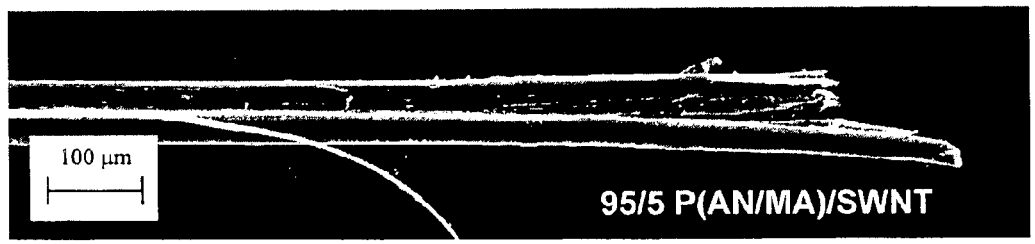
Figure 7C:
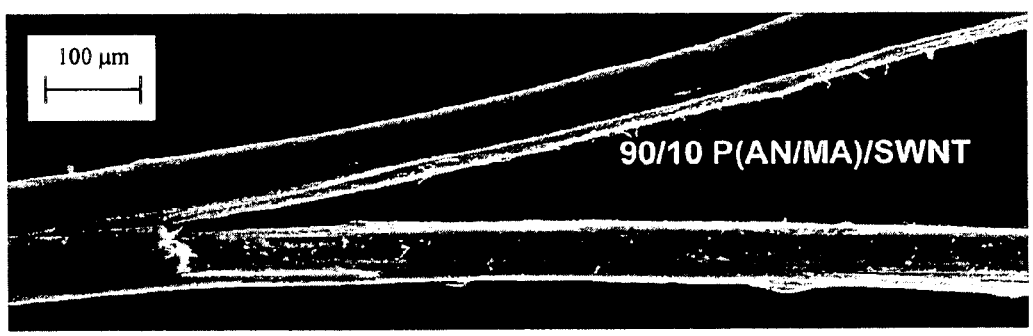
Figure 8A:
FIG. 8A shows a SEM micrograph of the inner structure of a P(AN/MA) fiber. Arrow indicates fiber axis direction.
Figure 8B:
FIG. 8B shows a SEM micrograph of the inner structure of a 95/5 P(AN/MA)/SWNT composite fiber. Arrow indicates fiber axis direction.
Figure 8C:
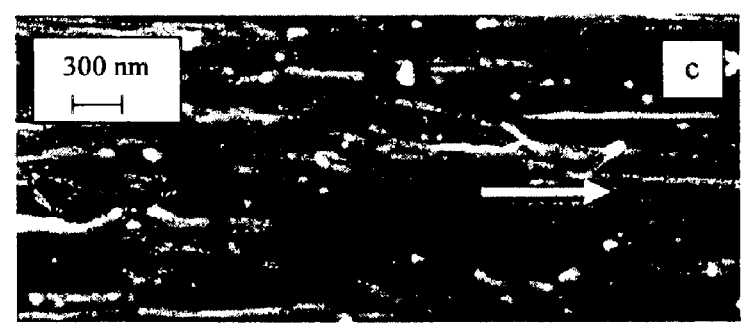
FIG. 8C shows a SEM micrograph of the inner structure of a 90/10 P(AN/MA)/SWNT composite fiber. Arrow indicates fiber axis direction.

Scanning electron micrographs of fiber tensile fracture surfaces show significant fibrillation in the control P(AN/MA) fiber as shown in FIG. 7A, while the 95/5 and 90/10 P(AN/MA)/SWNT composite fibers shown in FIGS. 7B and 7C, respectively, exhibited longitudinal splitting and almost no fibrillation. SWNT incorporation appeared to significantly reduce or prevent fibrillation in the composite fibers. Images of the fiber fractured surfaces at higher magnification are given in FIG. 8A for the P(AN/MA) fiber, and FIGS. 8B and 8C for the 95/5 and 90/10 P(AN/MA)/SWNT composite fibers, respectively.

Whereas drawn P(AN/MA) fiber readily dissolves in solvents, such as DMF and DMAc, the P(AN/MA)/SWNT composite fibers did not completely dissolve even after several days at room temperature, rather disintegrated millimeter (mm) and sub-mm-size particles were observed. Solvent filtered (through a Fisherbrand P5 filter paper) was colorless, indicating that the nanotubes did not dissolve, but FTIR analysis confirmed the presence of P(AN/MA) in the solvent. Based on residual weight analysis, about 50% of the P(AN/MA) in the 95/5 P(AN/MA)/SWNT composite fiber was dissolved. The rest of the polymer was presumed to remain entangled with individual SWNT or SWNT ropes and did not dissolve in DMF or DMAc.

Figure 9:
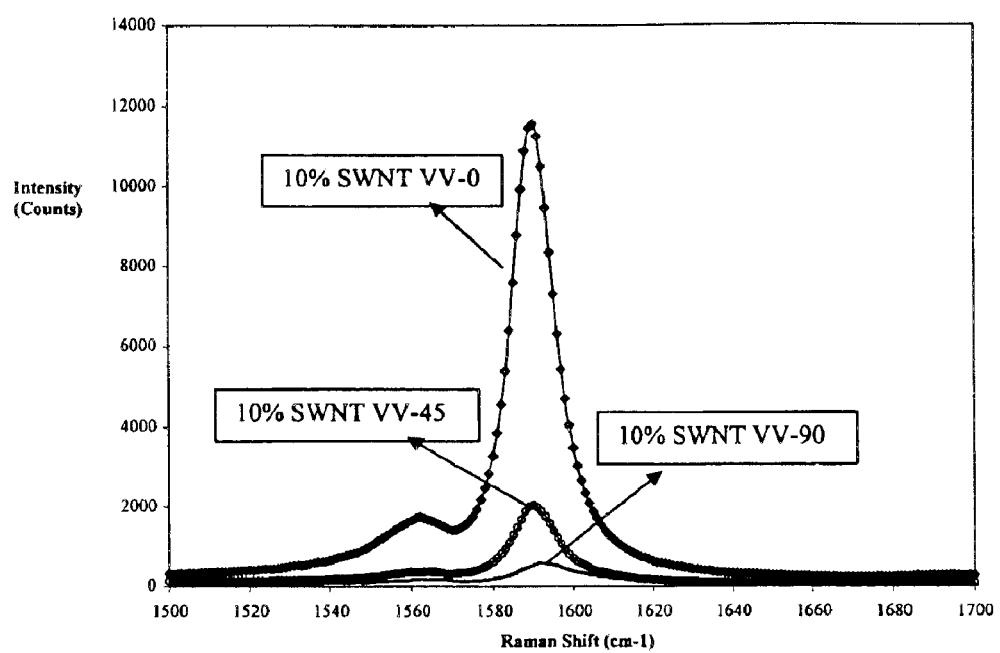
FIG. 9 shows tangential mode Raman spectra of a 90/10 P(AN/MA)/SWNT composite fiber at 0-, 45- and 90-degree angles between the fiber axis and polarization direction. The VV-0 (0-degree) orientation corresponds to a fiber axis parallel to the plane of infrared polarization direction. The VV-90 (90-degree) orientation corresponds to the fiber axis perpendicular to the plane of polarization direction.

Tangential-mode Raman spectra of the SWNT in the 90/10 P(AN/MA)/SWNT composite fiber were taken at 0-, 45- and 90-degree angles between the fiber axis and the polarization direction using "VV geometry" configuration. (For background information on VV geometry, see Hwang, et al., "Polarized spectroscopy of aligned single-wall carbon nanotubes," Phys. Rev. B, 62, No. 20, 15 November 2000-II, p. R13 310–313.) As shown in FIG. 9, the intensity of the peak at 1592 $cm^{-1}$ monotonically decreased with increasing angle between the fiber axis and the polarization direction of the polarizer, which is indicative substantial SWNT alignment in the composite fiber. Using the height of 1592 $cm^{-1}$ peak and based on a Gaussian distribution, Herman's orientation factors of P(AN/MA)/SWNT composite fibers with 1, 5, and 10 wt % SWNT at a common draw ratio of 4.3 were calculated to be 0.90, 0.94, and 0.92, respectively, indicative of substantial nanotube alignment along the fiber axis. Herman's orientation factor (f), an indicator of alignment, is given by $$f = \frac{3 <\cos^2 \theta> -1}{2},$$

where θ is the angle between SWNT and the fiber axis. A factor of 1 indicates complete alignment of the SWNT with the fiber axis.

Figure 10:
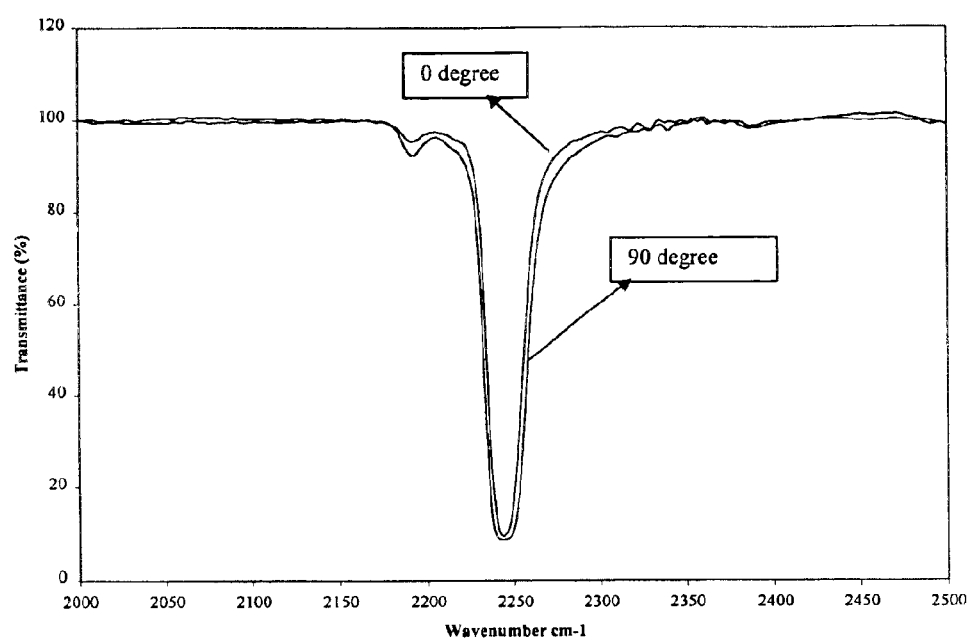
FIG. 10 shows polarized IR spectra of a P(AN/MA) fiber with the direction of polarization at 0-degrees (parallel) to the fiber axis and 90-degrees (perpendicular) to the fiber axis.
Figure 11:
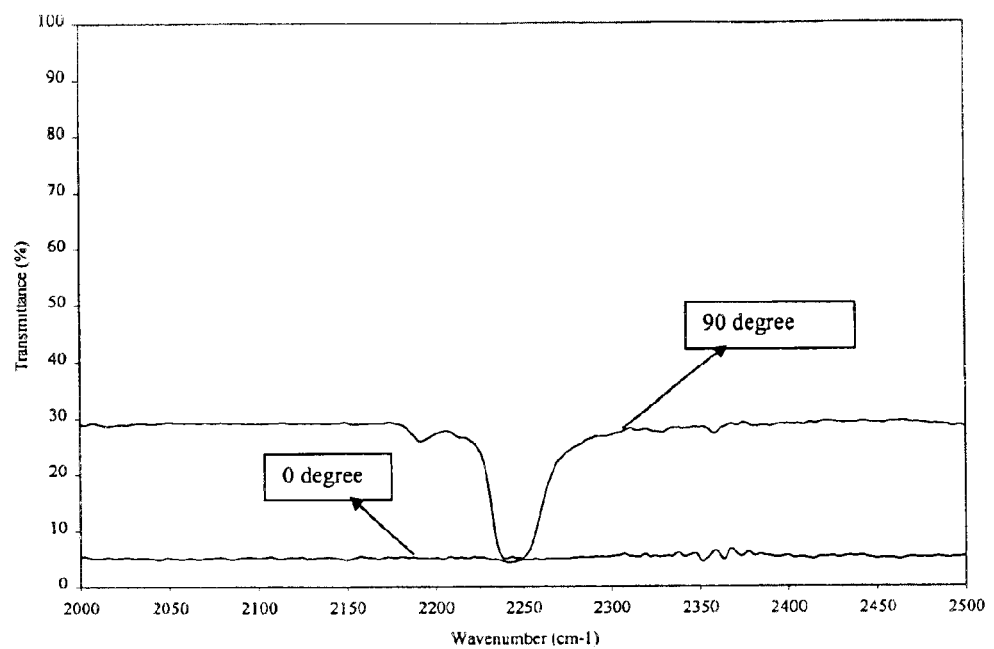
FIG. 11 shows polarized IR spectra of a 99/1 P(AN/MA)/SWNT composite fiber with the direction of polarization at 0-degrees (parallel) to the fiber axis and 90-degrees (perpendicular) to the fiber axis.

The substantial SWNT alignment in P(AN/MA)/SWNT composite fiber was also confirmed using polarized infrared (IR) spectroscopy. FIG. 10 shows polarized IR spectra in the 2000–2500 $cm^{-1}$ range for 4.3-draw ratio P(AN/MA) control and FIG. 11 shows polarized IR spectra in the same range for a 99/1 P(AN/MA)/SWNT composite fiber. Both sets of spectra were taken with the polarization directed parallel and perpendicular to the fiber axes. Although the parallel and perpendicular polarized spectra of P(AN/MA) control fiber are nearly identical, as shown in FIG. 10, significant absorption differences were observed in the parallel and perpendicular spectra for the 99/1 P(AN/MA)/SWNT composite fiber, shown in FIG. 11. At higher nanotube loading levels, such as polymer composites with 5 wt % nanotube incorporation, the IR absorption was so high that no transmitted beam was observed. Carbon nanotubes are intrinsically strong absorbers of radiation in the IR and near IR region. As the nanotube content increases, the absorption also increases, such that transmission can be completely or nearly extinguished. At such high absorption, signals due to the polymer are not observable. The absorption is greatest and transmission lowest when the nanotube axis and the polarizer are parallel to each other.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A macroscopic fiber comprising single-wall carbon nanotubes (SWNT) and an acrylonitrile-containing polymer, wherein the fiber has a cross-sectional dimension in the range of about 1 micron and about 100 microns.

2. The fiber or claim 1 wherein the polymer is selected from the group consisting of polyacrylonitrile, poly(acrylonitrile-methyl acrylate), poly(acrylonitrile-methacrylic acid), poly(acrylonitrile-acrylic acid), poly(acrylonitrile-itaconic acid), poly(acrylonitrile-methyl methacrylate), poly(acrylonitrile-itaconic acid-methyl acrylate), poly(acrylonitrile-methacrylic acid-methyl acrylate), poly(acrylonitrile-vinyl pyridine), poly(acrylonitrile-vinyl chloride), poly(acrylonitrile-vinyl acetate), and combinations thereof.

3. The fiber of claim 1 wherein the polymer is poly(acrylonitrile-methyl acrylate).

4. The fiber of claim 1 wherein the polymer is poly(acrylonitrile-itaconic acid-methyl acrylate).

5. The fiber of claim 1 wherein the polymer is poly(acrylonitrile-methyl methacrylate).

6. The fiber of claim 1 wherein the single-wall carbon nanotubes are derivatized with a functional group.

7. The fiber of claim 1 wherein the single-wall carbon nanotubes are present in the macroscopic fiber in a range of about 0.001 wt % and about 50 wt %.

8. The fiber of claim 1 wherein the single-wall carbon nanotubes are present in the macroscopic fiber in a range of about 1 wt % and about 25 wt %.

9. The fiber of claim 1 wherein the single-wall carbon nanotubes are present in the macroscopic fiber in the range of about 5 wt % and about 15 wt %.

10. The fiber of claim 1 wherein the fiber further comprises an anti-gelling agent.

11. The method of claim 10 wherein the anti-gelling agent comprises oxalic acid.

12. The fiber of claim 1 wherein the macroscopic fiber has a glass transition temperature that is higher than the glass transition temperature of tho polymer without SWNT.

13. The fiber of claim 1 wherein the macroscopic fiber has less shrinkage than a drawn fiber of the polymer without SWNT.

14. The fiber of claim 1 wherein the macroscopic fiber has a greater tensile modulus than a drawn fiber of the polymer without SWNT.

15. A drawn macroscopic fiber comprising a mixture of single wall carbon nanotubes (SWNT) and acrylonitrile-containing polymer, the fiber having a tensile strength of 0.25–3.52 GPa, an elongation of 9.9% to 14.3% and an initial tensile modulus of 8.0 to 16.3 GPa, wherein the fiber has a cross-section.

* * * * *

UNITED STATES PATENT AND TRADEMARK OFFICE
CERTIFICATE OF CORRECTION

PATENT NO. : 6,852,410 B2
DATED : February 8, 2005
INVENTOR(S) : Sreekumar T. Veedu and Satish Kumar It is certified that error appears in the above-identified patent and that said Letters Patent is hereby corrected as shown below:

<u>Column 16,</u>
Line 19, delete "or" and insert -- of --.
Line 52, delete "tho" and insert -- the --.
Line 62, delete "0.25-3.52" and insert -- 0.25-0.352 --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO.        : 6,852,410 B2                                    Page 1 of 1
APPLICATION NO.   : 10/609724
DATED             : February 8, 2005
INVENTOR(S)       : Sreekumar T. Veedu and Satish Kumar It is certified that error appears in the above-identified patent and that said Letters Patent is hereby corrected as shown below:

Delete figure 2
    Replace (original Figure 2) with Figure 2, as shown below.

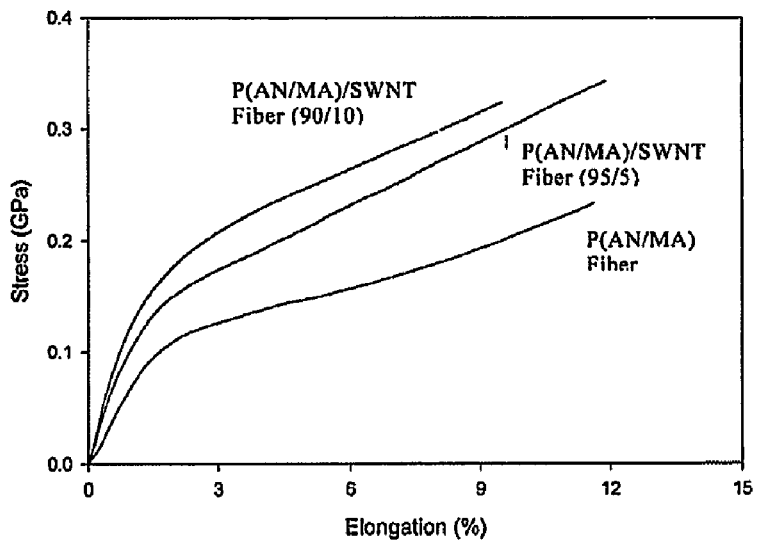

Figure 2

Signed and Sealed this

Twenty-eighth Day of August, 2007

JON W. DUDAS
*Director of the United States Patent and Trademark Office*